(12) United States Patent
Li

(10) Patent No.: US 8,253,374 B2
(45) Date of Patent: Aug. 28, 2012

(54) CHARGER FOR ELECTRONIC DEVICE

(75) Inventor: Jian-Hui Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 300 days.

(21) Appl. No.: 12/761,470

(22) Filed: Apr. 16, 2010

(65) Prior Publication Data

US 2011/0089890 A1    Apr. 21, 2011

(30) Foreign Application Priority Data

Oct. 16, 2009   (CN) .......................... 2009 1 0308404

(51) Int. Cl.
*H02J 7/00* (2006.01)
(52) U.S. Cl. ........................ 320/107; 320/111
(58) Field of Classification Search ................ 320/107, 320/111
See application file for complete search history.

(56) References Cited

U.S. PATENT DOCUMENTS

| | | | | |
|---|---|---|---|---|
| 5,689,413 | A * | 11/1997 | Jaramillo et al. | 363/146 |
| 7,170,258 | B2 * | 1/2007 | Sakai | 320/111 |
| 7,741,807 | B2 * | 6/2010 | Satsuma | 320/107 |
| 8,022,668 | B2 * | 9/2011 | Wang | 320/111 |
| 2007/0229025 | A1 * | 10/2007 | Tsai et al. | 320/111 |

* cited by examiner

*Primary Examiner* — M'Baye Diao
(74) *Attorney, Agent, or Firm* — Altis Law Group, Inc.

(57) ABSTRACT

A charger is configured for charging a battery. The battery includes a group of contacting portions. The charger includes a first base, a second base rotatably assembled to the first base, and two latching elements. Each of the latching elements includes a housing defining a cavity and fixed on the first base, a resilient element received in the cavity, a block, and a metal sheet fixed in the cavity. The resilient element elastically resists the block. A latching portion extends from the metal sheet and faces the block; the latching portion and the block sandwiches the group of the contacting portions. The present disclosure further discloses an electronic device using the battery.

8 Claims, 6 Drawing Sheets

CHARGER FOR ELECTRONIC DEVICE

BACKGROUND

1. Technical Field

The present disclosure generally relates to chargers, and particularly to a charger adapted to a battery for electronic devices.

2. Description of Related Art

Nowadays, portable electronic device such as mobile phones, laptops and personal digital assistants (PDAs) are widely used. The portable electronic device includes a battery providing power thereto. Thus, a battery connector is necessary to be used in the portable electronic device for connecting the portable electronic device to the battery.

However, not all types of batteries for portable electronic devices have the same standard. Each battery type may have different dimensions. Furthermore, the battery connector may be disposed in different positions of the battery. Thus, it can be inconvenient to charge different types of batteries.

Therefore, there is a room for improvement within the art.

BRIEF DESCRIPTION OF THE DRAWINGS

Many aspects of the charger for electronic device can be better understood with reference to the following drawings. The components in the drawings are not necessarily to scale, the emphasis instead being placed upon clearly illustrating the charger for electronic device. Moreover, in the drawings, like reference numerals designate corresponding parts throughout the several views.

DETAILED DESCRIPTION

Figure 1:
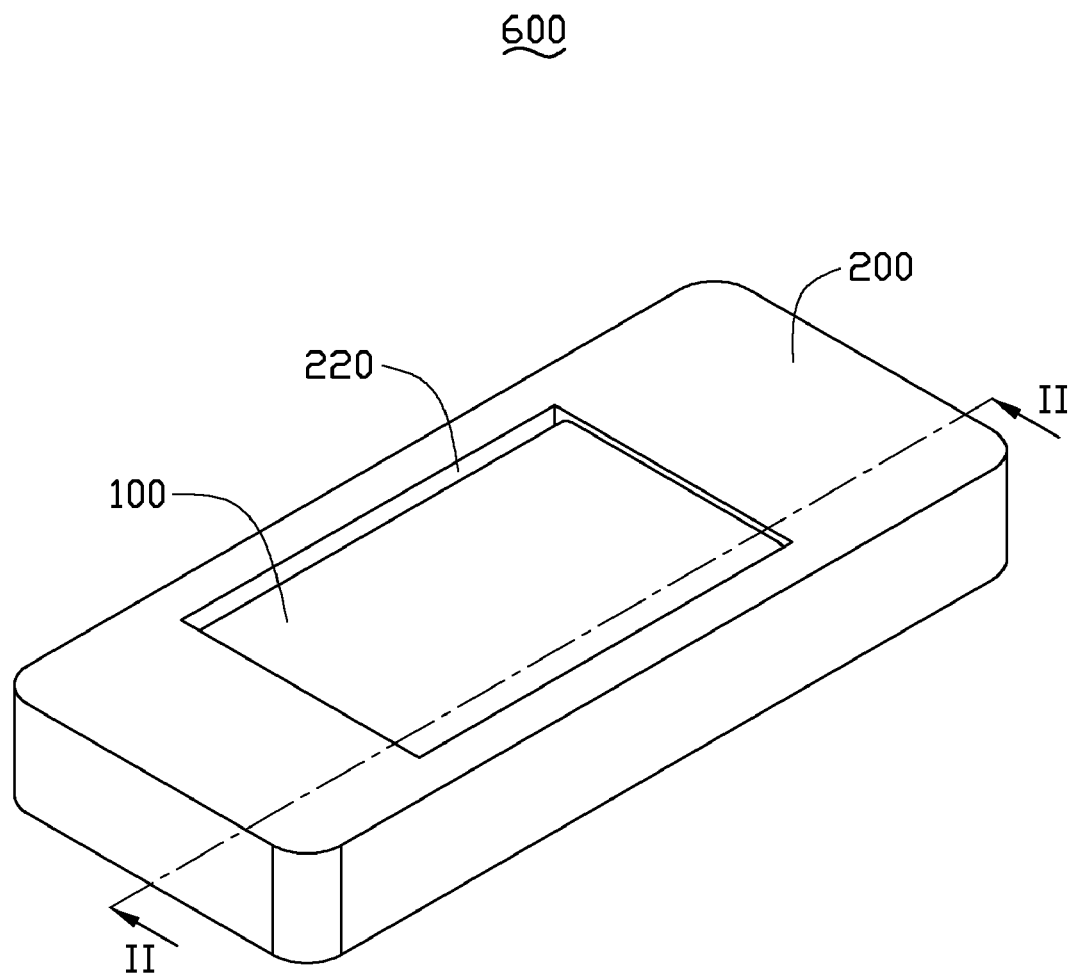
FIG. 1 is an isometric view of a battery assembled in a portable electronic device according to an exemplary embodiment.
Figure 2:
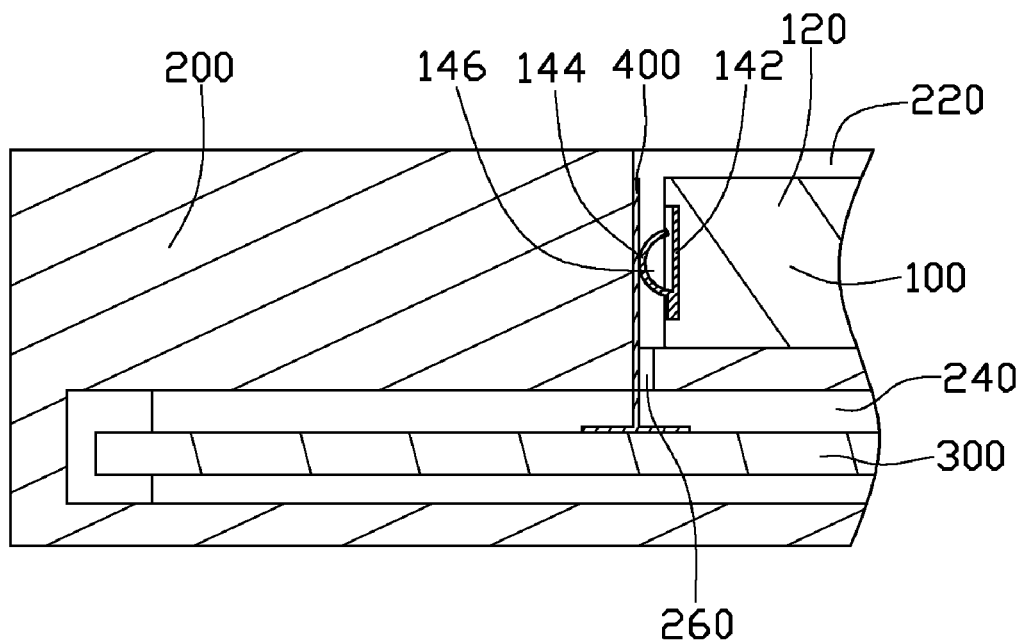
FIG. 2 is a cross sectional view of the portable electronic device taken along line II-II shown in FIG. 1.

FIG. 1 and FIG. 2 show an exemplary embodiment of an electronic device 600, such as a mobile phone, or a personal digital assistant. The electronic device 600 includes a main body 200 and a battery 100 received in the main body 200. The main body 200 includes a printed circuit board 300 electronically connected to the battery 100 by a connector 400. The battery 100 can be charged by a charger 500 (shown in FIG. 3).

Figure 3:
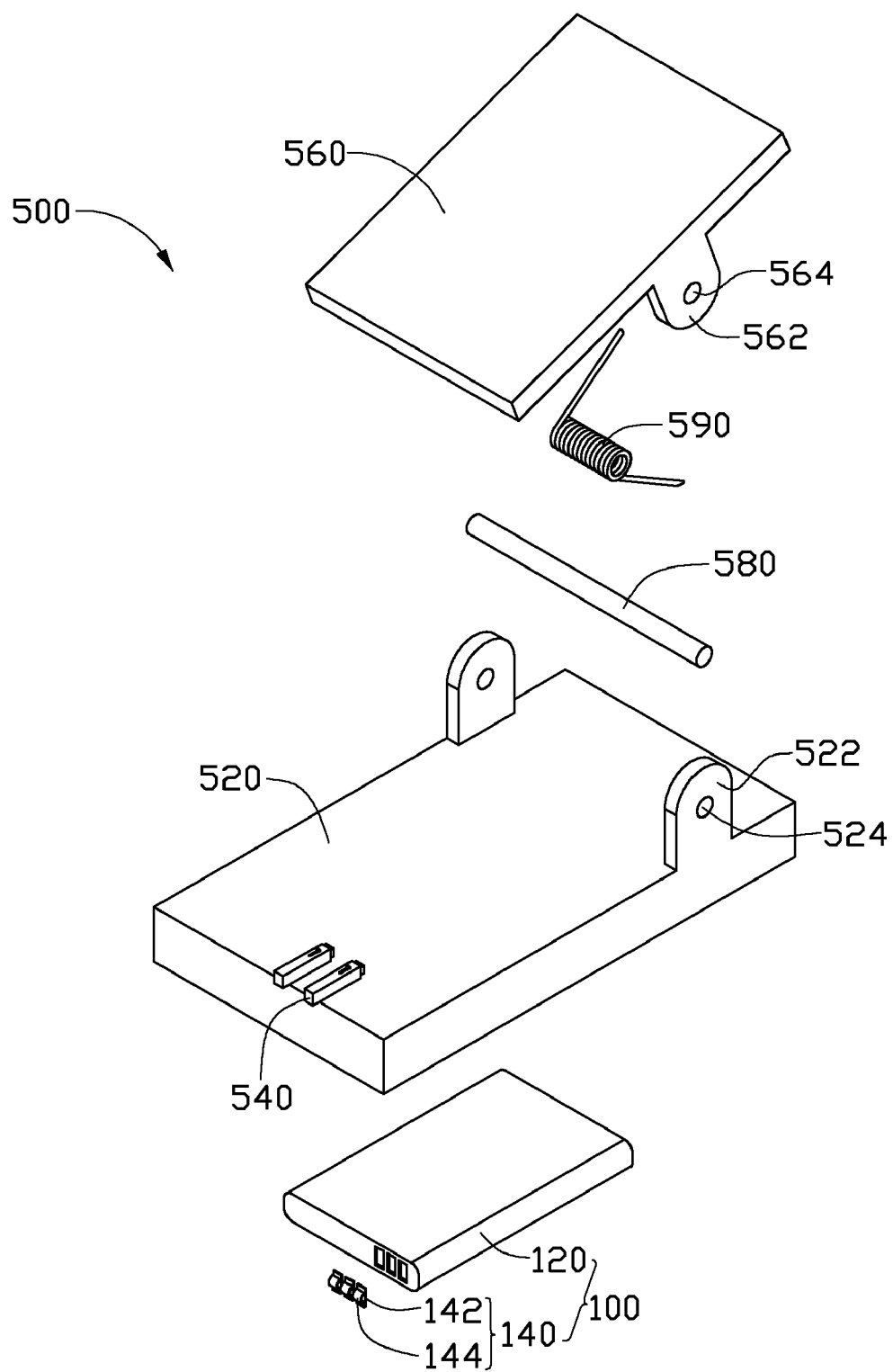
FIG. 3 is an exploded, isometric view of a battery and a charger according to an exemplary embodiment.

Referring to FIG. 3, the battery 100 includes a main section 120 and a plurality of contacts 140 disposed on an end of the main section 120. Each of the contacts 140 includes a fixed portion 142 and an arcuate contacting portion 144. An end of the contacting portion 144 is positioned on the fixed portion 142, a free end extending from the fixed portion 142 and bent into an arcuate shape. The free end of the contacting portion 144 and the fixed portion 142 are spaced from each other. The contacting portion 144 and the fixed portion 142 cooperatively define a space 146. Thus, the contacting portion 144 can deform toward the fixed portion 142.

The main body 200 defines a first chamber 220 and a second chamber 240 communicating with the first chamber 220 by a channel 260. The first chamber 220 is configured for receiving the battery 100. The second chamber 240 is configured for receiving the printed circuit board 300.

Figure 4:
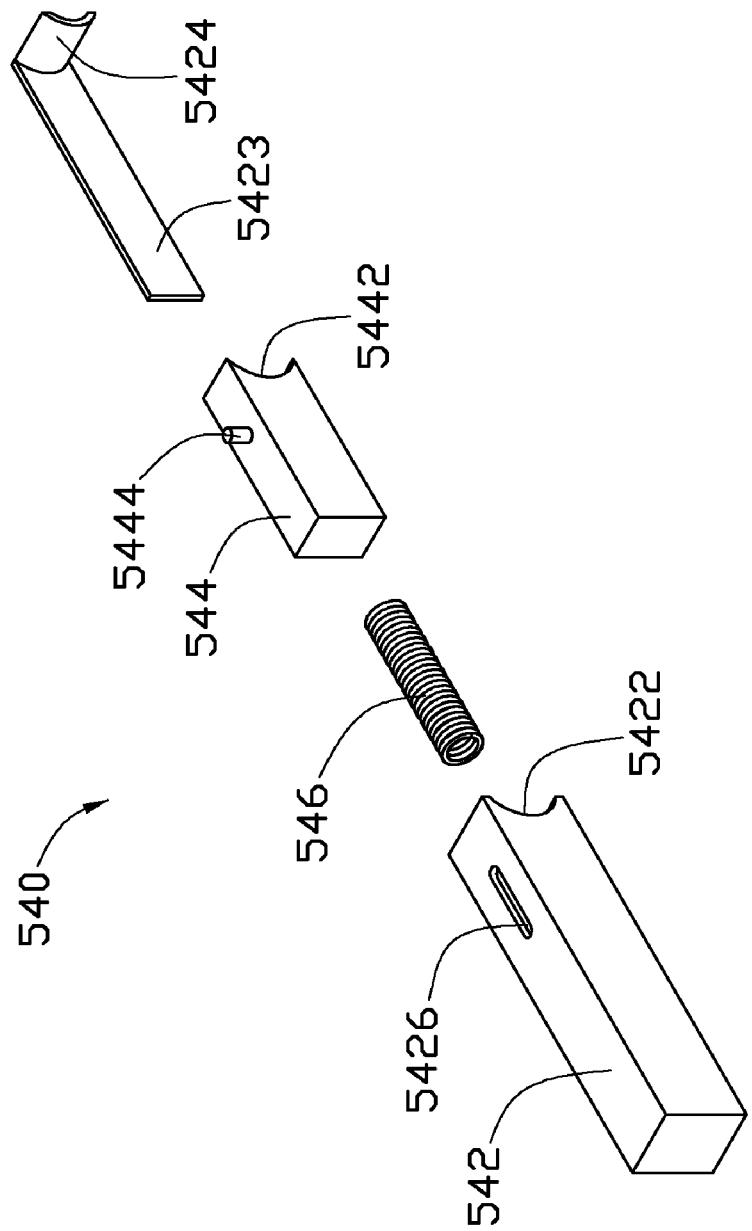
FIG. 4 is an exploded, isometric view of a latching element.

Referring to FIG. 3 and FIG. 4, the charger 500 includes a first base 520, two latching elements 540, a second base 560, a shaft 580, and a torsion spring 590. The first base 520 includes two first supporting plates 522. The first supporting plates 522 are symmetrically positioned at two sides of the first base 520. Each of the first supporting plates 522 defines a first through hole 524.

The latching elements 540 are welded on the first base 520. Each of the latching elements 540 includes a housing 542, a block 544, and a resilient element 546. The housing 542 defines a cavity 5422 and a slot 5426. The housing 542 includes a separate metal sheet 5423 configured for being received in the cavity 5422. A latching portion 5424 perpendicularly extends from the metal sheet 5423. The sheet 5423 is fixed on a sidewall of the cavity 5422. The latching portion 5424 can deform from the sheet 5423 and faces the cavity 5422. The latching portion 5424 has a configuration the same as the contacting portions 144, and is configured for contacting the contacting portions 144. The block 544 is slidably received in the cavity 5422, and includes a resisting portion 5442 and a post 5444. The resisting portion 5442 faces the latching portion 5424, and is configured for resisting the contacting portions 144. The post 5444 is positioned on a sidewall of the block 544. The post 5444 is slidably received in the slot 5426. The resilient element 546 is received in the cavity 5422 and elastically resists the block 544. Thus, the block 544 resists the latching portion 5424 of the resilient element 546. At this time, the resilient element 546 generates a resilient deformation.

The second base 560 includes two second supporting plates 562 symmetrically positioned at two sides thereof. Each of the second supporting plates 562 defines a second through hole 564 corresponding to the first through hole 524. The shaft 580 can be inserted into the first through hole 524 and the second through hole 564. The torsion spring 590 can coil around the shaft 580. Two ends of the torsion spring 590 can respectively abut against the first base 520 and the second base 560.

When the electronic device 600 is assembled, the printed circuit board 300 is placed in the second chamber 240. An end of the connector 400 electronically connects the printed circuit board 300. The other end of the connector 400 passes the channel 260, extends in the first chamber 220, and is attached to a sidewall of the first chamber 220. The battery 100 is placed into the first chamber 220, and the contacting portions 144 resist the connector 400.

When the charger 500 is assembled, first, the torsion spring 590 coils around the shaft 580, and the two ends of the shaft 580 are respectively inserted into the first through hole 524 and the second through hole 564. The two ends of the torsion spring 59 resist the first base 520 and the second base 560 to make an end of the second base 560 resist the first base 520. Thus, the second base 560 can rotate relative to the first base 520 with an external force. When the force is released, the second base 560 can restore to its original state.

Figure 5:
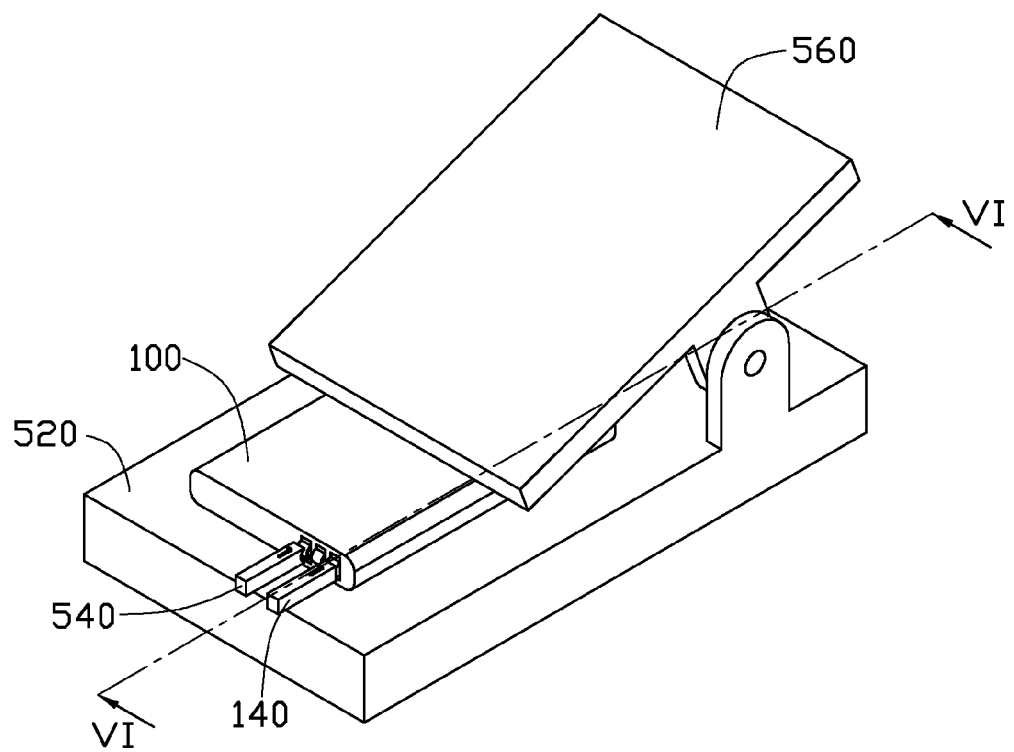
FIG. 5 is an assembled, isometric view of the battery in charging state.
Figure 6:
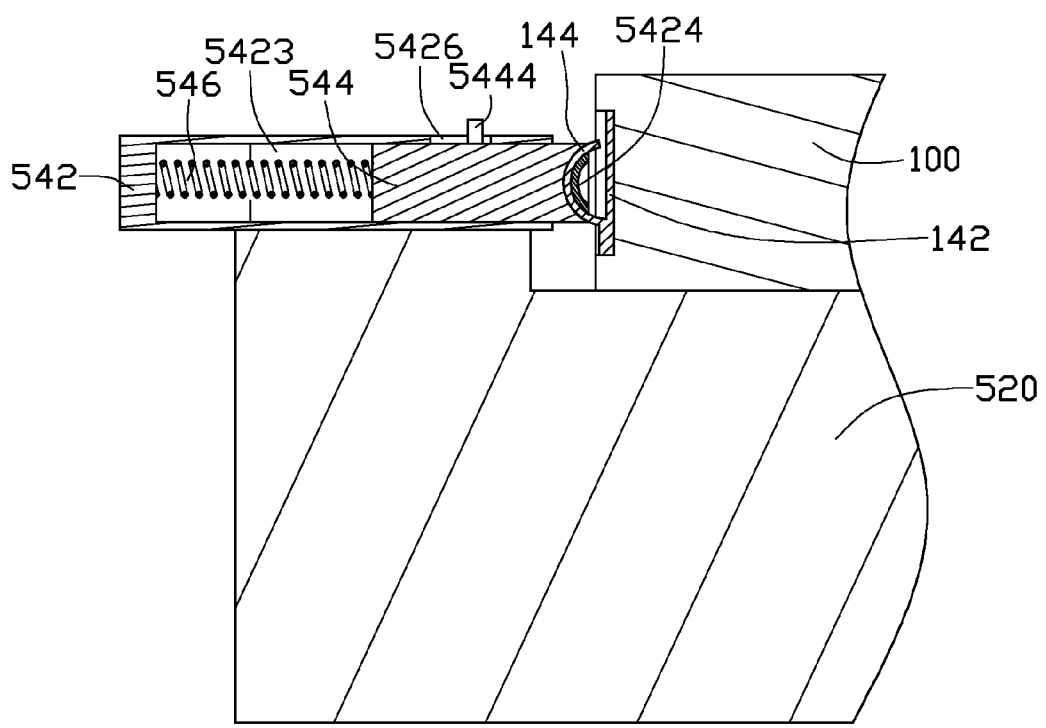
FIG. 6 is a cross sectional view taken along line VI-VI shown in FIG. 5.

Referring to FIG. 5 and FIG. 6, when the battery 100 is charged by the charger 500, first, the second base 560 is pressed and rotates around the shaft 580 by an external force. An end of the second base 560 is separated from the first base 520. Second, the battery 100 is placed between the first base 520 and the second base 560, and the contacting portions 144 face the latching elements 540. Then, the external force is released, the second base 560 rotates around the shaft 580, and an end of second base 560 resists the battery 100 by the torsion spring 590. Next, two posts 5444 are slid away from the battery 100 by an external force, and the resilient element 546 is compressed to generate a resilient force. Thus, the resisting portion 5442 and the latching portion 5424 define a latching space (not shown). Then, the contacting portions 144 are placed in the latching space. Finally, the external force is released from the posts 5444, and the blocks 544 resisting the contacting portions 144 with the resilient force. The contacting portions 144 are latched between the blocks 544 and the resisting portions 5442. Thus, the contacting portions 144 contact the resisting portions 5442, the battery 100 can be charged when the charger 500 connects to a power source. Because of the open frame structure of charger 500, batteries of different sizes may be charged therewith.

The charger 500 includes arcuate latching portions 5424 and the resisting portions 5442 resisting the latching portions 5424. The arcuate contacting portions 144 can be latched between the latching portions 5424 and the resisting portions 5442. Thus, wherever the contacts 140 are disposed on which position of the battery 100, the charger 500 can also charge the battery 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A charger for charging a battery, the battery comprising a group of contacting portions, the charger comprising:
   a first base;
   a second base rotatably assembled to the first base;
   two latching elements, each of the latching elements comprising:
      a housing fixed on the first base, the housing defining a cavity;
      a resilient element received in the cavity;
      a block slidably received in the cavity; the resilient element elastically resisting the block; and
      a metal sheet fixed in the cavity, a latching portion extending from the metal sheet and facing the block; the latching portion and the block sandwiching the group of the contacting portions.

2. The charger as claimed in claim 1, wherein the housing defines a sliding slot, the block comprises a post is positioned thereon, the post is slidably received in the slot.

3. The charger as claimed in claim 1, wherein the contacting portion is arcuate, the block comprises a resisting portion facing the contacting portion; the resisting portion and the contacting portions are arcuate corresponding to the contacting portion.

4. The charger as claimed in claim 1, wherein the first base comprises two first supporting plates, the second base comprises two second supporting plates; the charger further comprises a shaft connecting the first supporting plates to the two second supporting plates, and the first base are rotatably assembled around the shaft.

5. The charger as claimed in claim 4, further comprising a torsion spring coiling around the shaft, two ends of the torsion spring resist the first base and the second base.

6. An electronic device comprising:
   a battery comprising: a main section;
      a plurality of contacts disposed on the main section, each of the contacts comprising:
         a fixed portion fixed on the main section;
         a contacting portion with one end connected to the fixed portion, and another end being bent toward the fixed portion, the contacting portion and the fixed portion cooperatively defining a deformable space;
   a charger comprising:
      a first base;
      a second base rotatably assembled to the first base;
      two latching elements, each of the latching elements comprising:
         a housing fixed on the first base, the housing defining a cavity;
         a resilient element received in the cavity;
         a block slidably received in the cavity; the resilient element elastically resisting the block; and
   wherein the housing comprises a metal sheet fixed in the cavity, a latching portion extending from the metal sheet and facing the block; the battery is hold between the first base and the second base, the latching portion and the block sandwiching a group of the contacting portions.

7. The electronic device as claimed in claim 6, wherein the block comprises a post positioned thereon; the housing defines a slot, the post is slidably received in the slot.

8. The electronic device as claimed in claim 6, wherein the block further comprises a resisting portion facing the latching portion; the contacting portion is sandwiched between the latching portion and the resisting portion.

\* \* \* \* \*